United States Patent
Wan et al.

(10) Patent No.: US 10,129,207 B1
(45) Date of Patent: Nov. 13, 2018

(54) NETWORK ADDRESS TRANSLATION WITHIN NETWORK DEVICE HAVING MULTIPLE SERVICE UNITS

(71) Applicant: Juniper Networks, Inc., Sunnyvale, CA (US)

(72) Inventors: Wei Wan, Beijing (CN); Zengqiang Yuan, Beijing (CN); Qiong Wang, Beijing (CN)

(73) Assignee: Juniper Networks, Inc., Sunnyvale, CA (US)

(*) Notice: Subject to any disclaimer, the term of this patent is extended or adjusted under 35 U.S.C. 154(b) by 279 days.

(21) Appl. No.: 14/803,328

(22) Filed: Jul. 20, 2015

(51) Int. Cl.
  H04W 4/00 (2018.01)
  H04L 29/12 (2006.01)
  H04L 12/741 (2013.01)
  H04L 29/06 (2006.01)

(52) U.S. Cl.
  CPC ......... H04L 61/256 (2013.01); H04L 45/74 (2013.01); H04L 69/22 (2013.01)

(58) Field of Classification Search
  CPC .................. H04L 12/66; H04L 61/2007
  USPC ................................. 370/252–400
  See application file for complete search history.

(56) References Cited

U.S. PATENT DOCUMENTS

| | | | |
|---|---|---|---|
| 6,006,269 A | 12/1999 | Phaal | |
| 6,571,287 B1 | 5/2003 | Knight et al. | |
| 6,687,245 B2 | 2/2004 | Fangman et al. | |
| 7,058,973 B1 | 6/2006 | Sultan | |
| 7,184,437 B1 | 2/2007 | Cole et al. | |
| 7,194,767 B1 | 3/2007 | Boydstun et al. | |
| 7,246,178 B2 | 7/2007 | Roberts et al. | |

(Continued)

FOREIGN PATENT DOCUMENTS

| CN | 101742633 A | 6/2010 |
|---|---|---|
| CN | 102148767 A | 8/2011 |

(Continued)

OTHER PUBLICATIONS

"Junos OS, Security Configuration Guide," Release 12.1, Juniper Networks, Inc., retrieved from http://www.juniper.net/techpubs/en_US/junos12.1/information-products/topic-collections/security/software-all/security/junos-security-swconfig-security.pdf, Mar. 9, 2012, 1852 pp.

(Continued)

*Primary Examiner* — Iqbal Zaidi
(74) *Attorney, Agent, or Firm* — Shumaker & Sieffert, P.A.

(57) ABSTRACT

A network device having multiple service units receives an outbound packet of a communication session, where the service units can perform network address translation (NAT) on the outbound packet. The outbound packet includes a private source network address and source port. The network device applies a service unit selection function to a header of the outbound packet to produce a first result, and selects, based on the first result, a service unit to perform NAT for packets of the communication session. The network device determines a port for network address translation that produces a second result equal to the first result when the service unit selection function is applied to the portion of the header when the portion includes a selected public network address and determined port. The service unit can thereby perform session-aware services on packets of the communication session without redirecting the packets between the service units.

20 Claims, 5 Drawing Sheets

(56) References Cited

U.S. PATENT DOCUMENTS

| | | |
|---|---|---|
| 7,346,044 B1 | 3/2008 | Chou et al. |
| 7,386,628 B1 | 6/2008 | Hansell et al. |
| 7,624,195 B1 | 11/2009 | Biswas et al. |
| 7,649,912 B2 | 1/2010 | Balasubramanian et al. |
| 7,804,785 B2 | 9/2010 | Roberts et al. |
| 7,821,958 B2 | 10/2010 | Smith et al. |
| 7,876,790 B2 | 1/2011 | Cho et al. |
| 7,990,909 B2 | 8/2011 | Brueckheimer |
| 8,018,972 B2 | 9/2011 | Roberts et al. |
| 8,031,747 B2 | 10/2011 | Barry et al. |
| 8,050,559 B2 | 11/2011 | Sindhu |
| 8,259,571 B1 | 9/2012 | Raphel et al. |
| 8,270,438 B2 | 9/2012 | Barry et al. |
| 8,274,979 B2 | 9/2012 | Bragagnini et al. |
| 8,275,087 B2 | 9/2012 | Hadzic et al. |
| 8,300,749 B2 | 10/2012 | Hadzic et al. |
| 8,325,616 B2 | 12/2012 | Huang et al. |
| 8,339,959 B1 | 12/2012 | Moisand et al. |
| 8,391,271 B2 | 3/2013 | Mo et al. |
| 8,416,812 B2 | 4/2013 | Radulescu |
| 8,427,963 B2 | 4/2013 | Zampetti et al. |
| 8,458,338 B2 | 6/2013 | Karina et al. |
| 8,494,011 B2 | 7/2013 | Barry et al. |
| 8,553,542 B1 | 10/2013 | Szabo et al. |
| 8,571,008 B2 | 10/2013 | Kim et al. |
| 8,588,258 B2 | 11/2013 | Le Pallec et al. |
| 8,630,315 B2 | 1/2014 | Rivaud et al. |
| 8,650,279 B2 | 2/2014 | Mehta et al. |
| 8,656,052 B2 | 2/2014 | Carothers |
| 8,670,459 B2 | 3/2014 | Barry et al. |
| 8,701,179 B1 | 4/2014 | Penno et al. |
| 8,730,868 B2 | 5/2014 | Yamada et al. |
| 8,750,356 B2 | 6/2014 | Wang |
| 8,812,739 B2 | 8/2014 | Bryant et al. |
| 8,819,161 B1 | 8/2014 | Pannell et al. |
| 8,837,532 B2 | 9/2014 | Miyabe |
| 8,891,540 B2 | 11/2014 | Krishna et al. |
| 8,942,235 B1 | 1/2015 | Vinapamula et al. |
| 8,954,609 B1 | 2/2015 | Holleman et al. |
| 9,178,846 B1 | 11/2015 | Kamisetty et al. |
| 9,258,272 B1 | 2/2016 | Durand |
| 9,614,761 B1 | 4/2017 | Kamisetty et al. |
| 2001/0028651 A1 | 10/2001 | Murase |
| 2002/0138622 A1 | 9/2002 | Dorenbosch et al. |
| 2003/0058853 A1 | 3/2003 | Gorbatov et al. |
| 2004/0071149 A1 | 4/2004 | Kim et al. |
| 2006/0029081 A1 | 2/2006 | Yan et al. |
| 2006/0245454 A1 | 11/2006 | Balasubramanian et al. |
| 2006/0248581 A1 | 11/2006 | Sundarrajan et al. |
| 2007/0043876 A1 | 2/2007 | Varga et al. |
| 2007/0162968 A1 | 7/2007 | Ferreira et al. |
| 2008/0013524 A1 | 1/2008 | Hwang et al. |
| 2008/0044181 A1 | 2/2008 | Sindhu |
| 2008/0107112 A1 | 5/2008 | Kuo et al. |
| 2009/0034672 A1 | 2/2009 | Cho et al. |
| 2009/0109983 A1 | 4/2009 | Dixon et al. |
| 2009/0129301 A1 | 5/2009 | Belimpasakis |
| 2009/0135837 A1 | 5/2009 | Mohaban |
| 2009/0168808 A1 | 7/2009 | Cho et al. |
| 2009/0185501 A1 | 7/2009 | Huang et al. |
| 2010/0008260 A1 | 1/2010 | Kim et al. |
| 2010/0153560 A1 | 6/2010 | Capone et al. |
| 2010/0158051 A1 | 6/2010 | Hadzic et al. |
| 2010/0158181 A1 | 6/2010 | Hadzic |
| 2010/0158183 A1 | 6/2010 | Hadzic et al. |
| 2010/0175123 A1 | 7/2010 | Karino et al. |
| 2010/0214959 A1 | 8/2010 | Kuehnel et al. |
| 2010/0284405 A1 | 11/2010 | Lim |
| 2010/0329125 A1 | 12/2010 | Roberts et al. |
| 2011/0047256 A1 | 2/2011 | Babu et al. |
| 2011/0122775 A1 | 5/2011 | Zampetti et al. |
| 2011/0150008 A1 | 6/2011 | Le Pallec et al. |
| 2011/0153869 A1 | 6/2011 | Bryant et al. |
| 2011/0196945 A1 | 8/2011 | Alkhatib et al. |
| 2011/0200051 A1 | 8/2011 | Rivaud et al. |
| 2011/0219123 A1 | 9/2011 | Yang et al. |
| 2011/0249682 A1 | 10/2011 | Kean et al. |
| 2012/0023257 A1 | 1/2012 | Vos et al. |
| 2012/0110194 A1 | 5/2012 | Kikkawa et al. |
| 2012/0170631 A1 | 7/2012 | Liu |
| 2012/0250704 A1 | 10/2012 | Yamada et al. |
| 2012/0287948 A1 | 11/2012 | Ruffini et al. |
| 2012/0297089 A1 | 11/2012 | Carothers |
| 2012/0300859 A1 | 11/2012 | Chapman et al. |
| 2013/0039220 A1 | 2/2013 | Ruffini et al. |
| 2013/0054762 A1 | 2/2013 | Asveren |
| 2013/0067110 A1 | 3/2013 | Sarawat et al. |
| 2013/0080817 A1 | 3/2013 | Mihelic |
| 2013/0091303 A1 | 4/2013 | Mitra et al. |
| 2013/0103904 A1 | 4/2013 | Pangbom et al. |
| 2013/0121351 A1 | 5/2013 | Miyabe |
| 2013/0155945 A1 | 6/2013 | Chen |
| 2013/0166763 A1 | 6/2013 | Forsback |
| 2013/0208735 A1 | 8/2013 | Mizrahi et al. |
| 2013/0227008 A1 | 8/2013 | Yang |
| 2013/0259049 A1 | 10/2013 | Mizrahi |
| 2013/0283174 A1 | 10/2013 | Faridian et al. |
| 2013/0283175 A1 | 10/2013 | Faridian et al. |
| 2014/0161143 A1 | 6/2014 | Mizrahi et al. |
| 2014/0211714 A1 | 7/2014 | Li et al. |
| 2014/0211780 A1 | 7/2014 | Kang et al. |
| 2014/0226984 A1 | 8/2014 | Roberts et al. |
| 2015/0040238 A1* | 2/2015 | Sarsa Sarsa ........ H04L 61/2539 726/26 |
| 2016/0164699 A1* | 6/2016 | Ma ........................ H04L 61/251 726/12 |
| 2016/0164831 A1* | 6/2016 | Kim ........................ H04L 43/08 709/223 |

FOREIGN PATENT DOCUMENTS

| | | |
|---|---|---|
| JP | 4705656 B2 | 6/2011 |
| WO | 02076042 A1 | 9/2002 |
| WO | 2003096206 | 11/2003 |

OTHER PUBLICATIONS

Audet et al., "Network Address Translation (NAT) Behavioral Requirements for Unicast UDP," RFC 4787, Network Working Group, Jan. 2007, 29 pp.

Deering et al., "Internet Protocol, Version 6 (IPv6) Specification," RFC 2460, Network Working Group, Dec. 1998, 39 pp.

Diel et al., "Characterizing TCP Resets in Established Connections," Technical Reports CS-08-102, Computer Science Department, Colorado State University, Sep. 10, 2008, 10 pp.

Donley et al., "Deterministic Address Mapping to Reduce Logging in Carrier Grade NATs, draft-donley-behave-deterministic-cgn-00," Internet-Draft, Network Working Group, Sep. 26, 2011, 10 pp.

Durand et al., "Dual-Stack Lite Broadband Deployments Following IPv4 Exhaustion," RFC 6333, Internet Engineering Task Force (IETF), Aug. 2011, 32 pp.

Gaderer et al., "Improving Fault Tolerance in High-Precision Clock Synchronization," IEEE Transactions on Industrial Informatics, vol. 6, No. 2, May 2010, pp. 206-215.

Gont, "TCP's Reaction to Soft Errors," RFC 5461, Network Working Group, Feb. 2009, 14 pp.

Guha et al., "NAT Behavioral Requirements for TCP," RFC 5382, Network Working Group, Oct. 2008, 21 pp.

Harrington et al., "An Architecture for Describing Simple Network Management Protocol (SNMP) Management Frameworks," RFC 3411, Network Working Group, Dec. 2002, 60 pp.

IEEE-SA Standards Board, "Standard for a Precision Clock Synchronization Protocol for Networked Measurement and Control Systems," IEEE Std 1588TM-2008, IEEE Instrumentation and Measurement Society, Jul. 24, 2008, 289 pp.

Lentz et al., "Precision Timing in the Neptune Canada Network," Oceans 2009—Europe, IEEE, May 11-14, 2009, 5 pp.

Lenzen et al., "Optimal Clock Synchronization in Networks," Proceedings of the 7th ACM Conference on Embedded Networked Sensor Systems, ACM, Nov. 4, 2009, pp. 225-238.

(56) References Cited

OTHER PUBLICATIONS

Li et al., "Global Clock Synchronization in Sensor Networks," IEEE Transactions on Computers, vol. 55, No. 2, Feb. 2006, pp. 214-269.
Nilsson et al., "Fast Address Lookup for Internet Routers," Proceedings of Algorithms and Experiments, Feb. 9-11, 1998, pp. 9-18.
Penno et al., "Network Address Translation (NAT) Behavioral Requirements Updates, draft-penno-behave-rfc4787-5382-5508-bis-02," Internet-Draft, IETF, Nov. 16, 2011, 11 pp.
Penno et al., "Stateless DS-Lite, draft-penno-softwire-sdnat-02," Internet-Draft, Internet Engineering Task Force, Mar. 11, 2012, 11 pp.
Information Sciences Institute University of Southern California (editor: Postel), DARPA Internet Program Protocol Specification—Internet Protocol, RFC 791, Internet Engineering Task Force, Sep. 1981, 49 pp.
Schenato et al., "A Distributed Consensus Protocol for Clock Synchronization in Wireless Sensor Network," ThPl19.4, Proceedings of the 46th Conference on Decision and Control, Dec. 12-14, 2007, 6 pp.
Srisuresh et al., "NAT Behavioral Requirements for ICMP," RFC 5508, IETF, Network Working Group, Apr. 2009, 30 pp.
Sundararaman et al., "Clock Synchronization for Wireless Sensor Networks: A Survey," Science Direct, Elsevier, Ad Hoc Networks vol. 3, No. 3, Jan. 18, 2005, pp. 281-323.
Weibel et al., "High Precision Clock Synchronization according to IEEE 1588 Implementation and Performance Issues," Zurich University of Applied Sciences, Institute of Embedded Systems (InES), 2005, 9 pp. "Applicant points out, in accordance with MPEP 609.069a), that the year of publication, 2005, is sufficiently earlier than the effective U.S. filing date, Nov. 2, 2015, so that the particular month of publication is not in issue."
Yamagata et al., "NAT444, draft-shiraskaki-nat444-05," Internet-Draft, Internet Engineering Task Force, IETF, Jan. 5, 2012, 10 pp.

\* cited by examiner

NETWORK ADDRESS TRANSLATION WITHIN NETWORK DEVICE HAVING MULTIPLE SERVICE UNITS

TECHNICAL FIELD

The disclosure relates to computer networks and, more particularly, to network address translation in computer networks.

BACKGROUND

A computer network generally includes a number of interconnected network devices. Large networks, such as the Internet, typically include a number of interconnected computer networks, which in this context are often referred to as sub-networks or subnets. These subnets are each assigned a range of network addresses that can be allocated to the individual network devices that reside in the respective subnet. A server in each subnet may be responsible for allocating these network addresses in accordance with a network address allocation protocol, such as a dynamic host configuration protocol (DHCP).

Service provider networks typically assign private network addresses to the subscriber equipment (e.g., cable modems, DLS modems, mobile devices) utilized by their customers. For example, a DHCP server or Radius server may dynamically assign a private address to a subscriber device upon establishing a network connection for the subscriber equipment. When not in use, the network connection is torn down and the private address is returned to a pool of provider addresses utilized within the service provider network. These private addresses are not routable outside the service provider network. Instead, a network address translation (NAT) device translates the private addresses currently used by subscriber equipment to public network addresses that are routable within a public network, such as the Internet.

SUMMARY

In general, techniques for deterministic network address translation (NAT) are described. In particular, techniques are describes for ensuring that inbound and outbound packet flows for a subscriber communication session are processed by a same one of a plurality of services processing unit (SPUs) internal to a NAT device even when network address translation is performed on the subscriber session such that the inbound and outbound packets of the subscriber communication session may have different 5-tuple information in their headers.

In one aspect, a network device having multiple service units receives an outbound packet of a communication session, wherein the outbound packet includes a private source network address and source port. Each of the service units is configured to perform network address translation (NAT) on the outbound packet. The network device applies a service unit selection function to at least a portion of a header of the outbound packet to produce a first result, and selects, based on the first result, one of the service units to perform NAT for packets of the communication session. The network device determines a port for network address translation that produces a second result equal to the first result when the service unit selection function is applied to the portion of the header when the portion includes a selected public network address and determined port. This allows the selected service unit to perform session-aware services upon both inbound and outbound packets of the communication session without redirecting any of the inbound packets or the outbound packets between the service units for application of the session-aware services.

In one example, a method includes receiving, with a network device having a plurality of service units, an outbound packet of a communication session for a subscriber, wherein the outbound packet includes a private source network address and source port, and wherein each of the plurality of service units is configured to perform network address translation (NAT), and applying a service unit selection function to at least a portion of a header of the outbound packet to produce a first result. The method also includes selecting, based on the first result, a first one of the service units to perform NAT for packets of the communication session, selecting, with the network device, a public network address for network address translation of the outbound packet for the communication session, determining, with the network device, a port for network address translation that produces a second result equal to the first result when the service unit selection function is applied to the portion of the header after the private source network address and source port of the inbound packet are replaced with the selected public network address and determined port, generating a translated packet from the packet, wherein the translated packet includes the selected public network address and the determined port in place of the private source address and source port, and forwarding the translated packet from the network device to a public network.

In another example, a network device includes a network interface to receive an outbound packet of a communication session for a subscriber, wherein the outbound packet includes a private source network address and source port, a plurality of service units configured to perform network address translation (NAT), a service unit selector configured to apply a service unit selection function to at least a portion of a header of the outbound packet to produce a first result, and select, based on the first result, a first one of the service units to perform NAT for packets of the communication session, and a NAT controller configured to select a public network address for network address translation of the outbound packet for the communication session, wherein the controller determines a port for network address translation that produces a second result equal to the first result when the service unit selection function is applied to the portion of the header after the private source network address and source port of the inbound packet are replaced with the selected public network address and determined port.

In a further example, a non-transitory computer-readable storage medium includes instructions for causing at least one programmable processor of a network device having a plurality of service units to receive an outbound packet of a communication session for a subscriber, wherein the outbound packet includes a private source network address and source port, and wherein each of the plurality of service units is configured to perform network address translation (NAT); apply a service unit selection function to at least a portion of a header of the outbound packet to produce a first result; select, based on the first result, a first one of the service units to perform NAT for packets of the communication session; select a public network address for network address translation of the outbound packet for the communication session; determine a port for network address translation that produces a second result equal to the first result when the service unit selection function is applied to the portion of the header after the private source network address and source port of the inbound packet are replaced with the selected public network address and determined port; generate a translated packet from the packet, wherein the translated packet includes the selected public network address and the determined port in place of the private source address and source port; and forward the translated packet from the network device to a public network.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
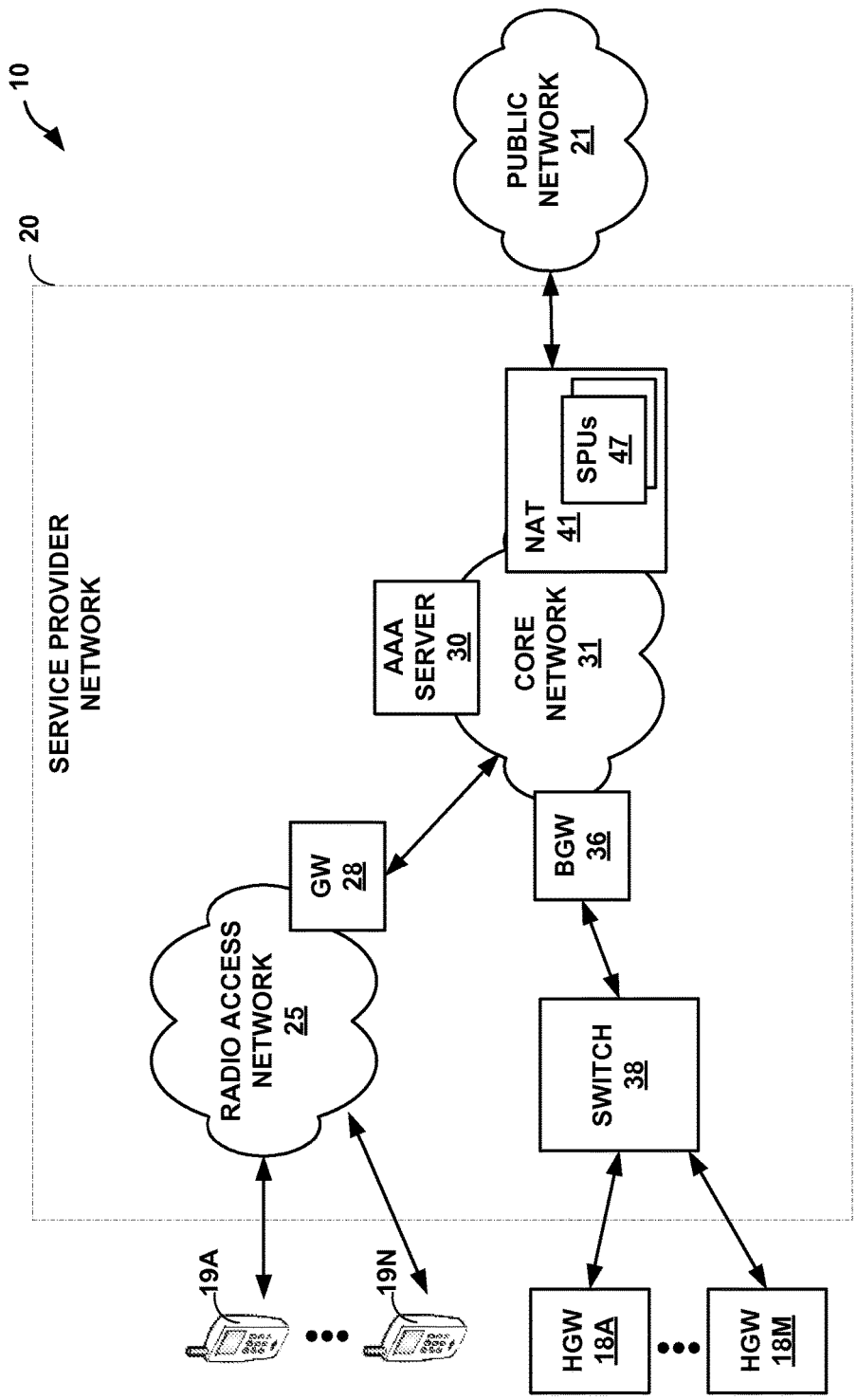
FIG. 1 is a block diagram illustrating an exemplary network system that implements the network address translation techniques described in this disclosure.

FIG. 1 is a block diagram illustrating an exemplary network system 10 that implements the network address translation techniques described in this disclosure. As shown in the example of FIG. 1, network system 10 includes a service provider network 20 and a public network 21.

In the example of FIG. 1, service provider network 20 operates as a private network that provides packet-based network access for subscribers associated with home gateways 18A-18M ("HGWs" 18) or mobile devices 19. HGWs 18 are service endpoint computing devices, such as personal computers, laptop computers or other types of computing device associated with the subscribers. In addition, service provider network 20 may provide data services to cellular mobile devices 19A-19N ("mobile devices 19"). Mobile devices 19 may comprise, for example, a mobile telephone, a laptop or desktop computer having, e.g., a 3G wireless card, a wireless-capable netbook, a video game device, a pager, a smart phone, or a personal data assistant (PDA). Each of mobile devices 19 may run one or more applications, such as mobile calls, video games, videoconferencing, and email, among others.

In the example of FIG. 1, HGWs 18 connect to a broadband network gateway (BGW) 36 via network switch 38. In one example, HGWs may be DSL modems and network switch 38 may comprise a digital subscriber line access multiplexer (DSLAM) or other switching device. Each of HGWs 18 may utilize a Point-to-Point Protocol (PPP), such as PPP over ATM or PPP over Ethernet (PPPoE), to communicate with network switch 38. For example, using PPP, one of HGWs 18 may request access to core network 31 and provide login information, such as a username and password, for authentication by AAA server 30. PPP may be supported on lines such as digital subscriber lines (DSLs) that connect endpoint computing devices 18 with network switch 38. In other embodiments, endpoint computing devices 18 may utilize a non-PPP protocol to communicate with network switch 38. Other embodiments may use other lines besides DSL lines, such as cable, Ethernet over a T1, T3 or other access links.

Network switch 38 may communicate with broadband network gateway 36 over a physical interface supporting various protocols, e.g., ATM interface supporting ATM protocols. Broadband network gateway 36 typically includes Broadband Remote Access Server (BRAS) functionality to aggregate output from switches into a higher-speed uplink to core network 31. In some embodiments, broadband network gateway 36 may comprise a router that maintains routing information between endpoint computing devices 18 and core network 31.

Service provider network 20 may also include radio access network 25 in which one or more base stations communicate via radio signals with mobile devices 19. Radio access network 25 is a transport network that enables base stations to exchange packetized data with core network 31 of the service provider, ultimately for communication with public network 21. Radio access network 25 typically comprises communication nodes interconnected by communication links, such as leased land-lines or point-to-point microwave connection. The communication nodes comprise network, aggregation, and switching elements that execute one or more protocols to route packets between base stations and gateway device ("GW") 28. Core network 31 provides session management, mobility management, and transport services between backhaul network 27 and core network 31 to support access, by mobile devices 19, to public network 21 and services of protected resources 14. Core network 31 may comprise, for instance, a general packet radio service (GPRS) core packet-switched network, a GPRS core circuit-switched network, an IP-based mobile multimedia core network, or another type of transport network. Core network 31 typically includes one or more packet processing nodes to support firewall, load balancing, billing, deep-packet inspection (DPI), and other services for mobile traffic traversing the mobile core network.

AAA server 30 is typically an authentication, authorization and accounting (AAA) server to authenticate the credentials of a subscriber requesting a network connection. The AAA server 30 may be integrated within a router or gateway of broadband network or on a separate network device and may be, for example, a Remote Authentication Dial-In User Service (RADIUS) server. Upon authenticating a network access request from either an HGW 18 or a mobile device 19, AAA server 30 assigns a private layer three (L3) network address (e.g., an IPv4 network address) for receiving data services within service provider network 20. This may be accomplished in a variety of ways. For example, the private network address may be statically configured on the subscriber device or may be dynamically or statically assigned by AAA server 30 (or gateway 28). Typically, upon authentication of the subscriber, AAA server 30 selects a private IP address from a pool of private network addresses. In some cases, BGW 36 or GW 28 may send a Radius authentication request to AAA server 30 for authentication and assignment of an IP address.

Once authenticated, any of HGWs 18 or mobile devices 19 may send subscriber data traffic toward core network 31 in order to access and receive services provided by public network 21, and such packets traverse network address translation (NAT) device 41 as part of at least one packet flow. The term "packet flow," "traffic flow," or simply "flow" refers to a set of packets originating from a particular source device and sent to a particular destination device. A single flow of packets, in either the outbound (sourced by one of HGWs 18 or mobile devices 19) or inbound (destined for one of HGWs 18 or mobile devices 19) direction, may be identified by, for example, the 5-tuple: <source network address, destination network address, source port, destination port, protocol>. A pair of outbound packets and inbound packets (i.e., packet flows) may be part of the same communication session. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet. Moreover, a subscriber device may originate multiple packet flows upon authenticating to service provider network 20 and establishing a communication session for receiving data services.

NAT device 41 may be a gateway or other appliance that provides services, such as network address translation for private network addresses routable within service provider network to public network addresses routable within public network 21. As described herein, NAT device 41 includes a plurality of services processing units (SPUs) 47 that apply network services to communication sessions associated with the subscribers As described herein, NAT device 41 directs inbound and outbound packet flows for each individual session to SPUs 47 for processing based on a service unit selection function, such as a hash value of the 5-tuple within headers of packets of the given packet flow, where the 5-tuple specifies a combination of the private source network address, source port, a public destination network address, destination port and protocol specified in the header of the inbound packet. Moreover, the techniques described herein ensure that even though a selection function, such as a hash function, is used to distribute packet flows across SPU 47, both outbound packets and inbound packets of a NATed session will have the same hash value and are directed to the same SPU even though the packet headers likely differ due to the NAT operation. As such, the techniques avoid potentially having to internally redirect the inbound packet for a session from one SPU to another to ensure that both inbound and outbound packet flows for a session are directed to the same SPU for proper application of services. This can be useful when the SPU must also apply session-aware services to inbound and outbound packet flows of the communication session, such as firewall operations, billing services, deep-packet inspection (DPI), for example. Avoiding a need to internally redirect inbound packets between SPUs can result in more streamlined packet processing, and potentially save time and computing resources.

Figure 2:
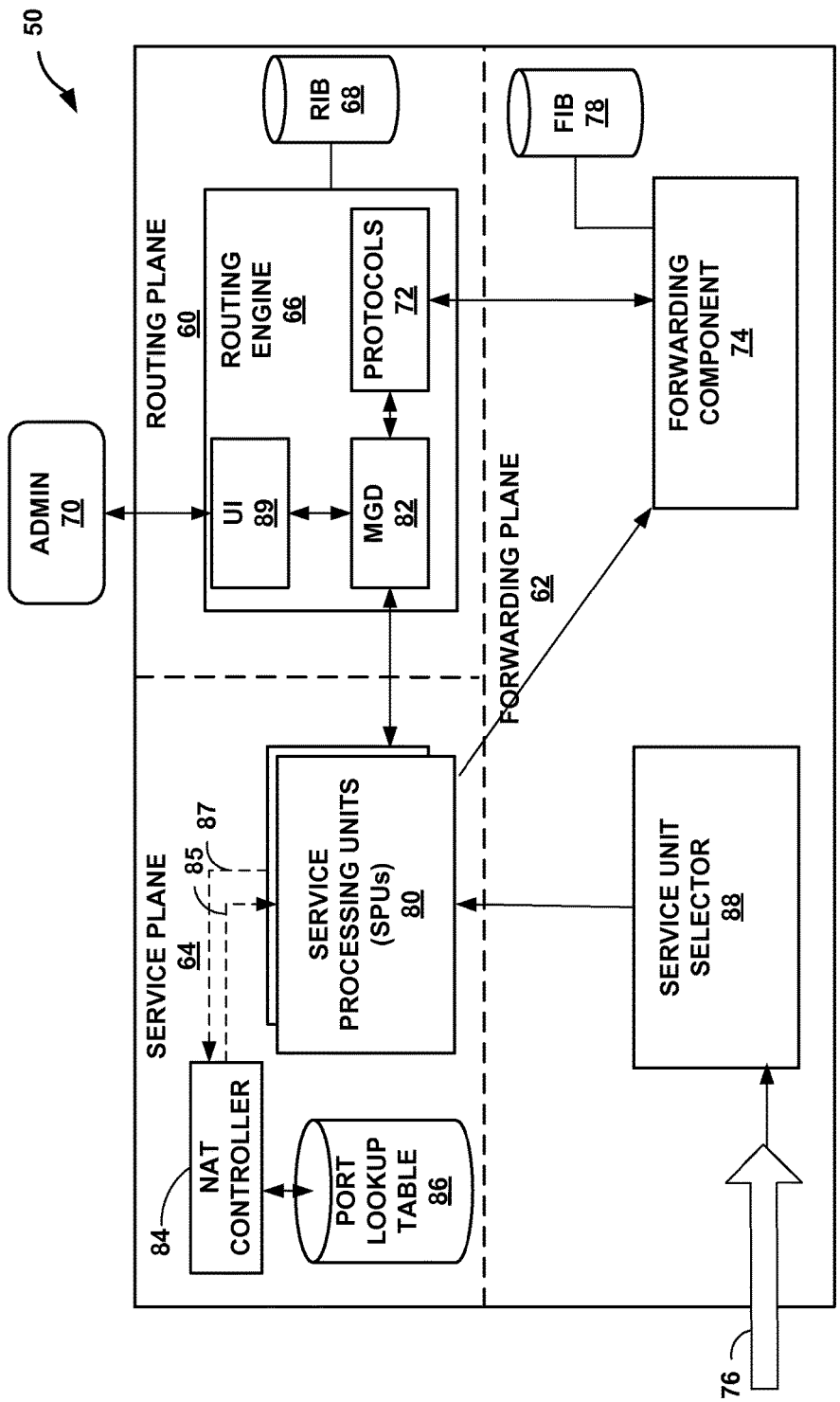
FIG. 2 illustrates an example network device that incorporates the NAT functions described herein.

FIG. 2 illustrates an example network device 50 that incorporates the NAT functions described herein. In this example, network device 50 may be a standalone device or a router or gateway device. Network device 50 may perform the functions described above with respect to NAT device 41 of FIG. 1. As such example, network device 50 may, for example, be a high-end router or gateway capable of deployment within a service provider network.

In the example of FIG. 2, the components of network device 50 may be logically organized into a routing plane 60, a forwarding plane 62 and a service plane 64. Routing plane 60 provides a routing engine 66 that is primarily responsible for maintaining a routing information base (RIB) 222 to reflect the current topology of a network and other network entities to which network device 50 is connected. For example, routing engine 66 provides an operating environment for execution of routing protocols 70 that communicate with peer routers and periodically update RIB 68 to accurately reflect the topology of the network and the other network entities. Example protocols include routing and label switching protocols, such as Border Gateway Protocol (BGP), Intermediate System-to-Intermediate System (IS-IS), Resource Reservation Protocol with Traffic Engineering Extensions (RSVP-TE) and Label Distribution Protocol (LDP). In some embodiments, network device 50 may be a mobile gateway having a distributed control plane for handling mobile subscribers, such as described within U.S. patent application Ser. No. 13/172,556, entitled "MOBILE GATEWAY HAVING DECENTRALIZED CONTROL PLANE FOR ANCHORING SUBSCRIBER SESSIONS," the entire contents of which being incorporated herein by reference.

In this example, network device 50 includes a plurality of service processing units 80, each configured to apply session-aware services to communication sessions associated with a plurality of the subscribers. Each of the SPUs 80 may, for example, be configured to perform network address translation, firewall operations, load balancing, billing, deep-packet inspection (DPI), and other services for subscriber sessions.

Forwarding plane 62 receives and forwards packets associated with network packet flows 76. Forwarding component 74 maintains forwarding information base (FIB) 78 in accordance with RIB 68, which associates network destinations or MPLS labels with specific next hops and corresponding interface ports of output interface cards of network device 50. Routing engine 66 typically processes RIB 68 to perform route selection and generate FIB 78 based on selected routes. In this way, next hop information may be programmed into forwarding plane 62. Routing engine 66 may generate FIB 78 in the form of a radix tree having leaf nodes that represent destinations within the network. U.S. Pat. No. 7,184,437, the content of which is incorporated herein by reference in its entirety, provides details on an exemplary embodiment of a router that utilizes a radix tree for route resolution.

When forwarding a packet, forwarding component 74 traverses the radix tree to a leaf node based on information within a header of the packet to ultimately select a next hop and output interface to which to forward the packet. Based on the selection, forwarding component may output the packet directly to the output interface or, in the case of a multi-stage switch fabric of a high-end router, may forward the packet to subsequent stages for switching to the proper output interface. Forwarding plane 62 may be provided by dedicated forwarding integrated circuits normally associated with high-end routing and forwarding components of a network router. U.S. Patent Application 2008/0044181, entitled MULTI-CHASSIS ROUTER WITH MULTI-PLEXED OPTICAL INTERCONNECTS, describes a multi-chassis router in which a multi-stage switch fabric, such as a 3-stage Clos switch fabric, is used as a high-end forwarding plane to relay packets between multiple routing nodes of the multi-chassis router. The entire contents of U.S. Patent Application 2008/0044181 are incorporated herein by reference.

In this way, as shown in the example of FIG. 2, network device 50 integrates service plane 64 and routing plane 60 to utilize shared forwarding plane 62. Forwarding plane 62 may be a rich and dynamic shared forwarding plane, optionally distributed over a multi-chassis router. Moreover, forwarding plane 62 may be provided by dedicated forwarding integrated circuits normally associated with high-end routing components of a network router. Consequently, routing plane 60 and forwarding plane 62 may operate as a high-end router or gateway, and service plane 64 has been tightly integrated within network device 50 (e.g., by way of service processing units (SPUs) 80) so as to use forwarding plane 62 of the routing components in a shared, cooperative manner. Further details of one example embodiment of network device 50 can be found in U.S. Pat. No. 8,339,959, filed May 20, 2008, entitled "STREAMLINED PACKET FORWARDING USING DYNAMIC FILTERS FOR ROUTING AND SECURITY IN A SHARED FORWARDING PLANE," the entire contents of which is incorporated herein by reference.

Forwarding plane 62 includes a service unit selector 88 to selectively direct packets of communication sessions to one or more of service processing units 80 of service plane 64 for processing. For example, service unit selector 88 receives incoming packet flows 76 (e.g., outbound packets sourced by subscribers or inbound packets destined to subscribers) and applies a service processing unit selection function to direct the packets to service plane 64 for processing by service processing unit 80. For example, service unit selector 88 may apply a hash function to at least a portion of the header of each packet and then apply a modulo operation based on the number N of SPUs 80 installed in network device 50 to compute a remainder ranging from 0-N. Based on the remainder N, service unit selector 88 selects the corresponding one of SPU and directs the packet flows to the selected SPU 80 for NAT and application of any other session-aware services. When applying the hash function, service unit selector 88 may apply the hash function to a 5-tuple of the header of the packet, where the 5-tuple specifies a combination of the private source network address, source port, a public destination network address, destination port and protocol specified in the header of the packet.

Service processing units 80 receive packets from a given packet flow from service unit selector 88, computes NAT information as described herein to select a public network address and port for the packet flow, perform any additional services and relay the packets to forwarding plane 62 for forwarding by forwarding component 74 in accordance with FIB 78. Service processing units 80 within service plane 64 may be installed along a backplane or other interconnect of network device 50 to perform a variety of other services on the packets received from forwarding plane 62, such as NAT, filtering, logging, Intrusion Detection and Prevention (IDP) analysis, virus scanning, deep packet inspection. In some examples, service processing units 80 may comprise one or more service cards installed within router 50. For example, one or more of service processing units 80 may be implemented as a removable card having an electronic interface suitable for removable installation within a communication backplane of network device 50.

In the example of FIG. 2, service plane 64 includes a NAT controller 84 that operates to assign network addresses and ports to subscriber sessions in accordance with the techniques described herein. For example, NAT controller 84 responds to queries 85 from SPUs for a public network address and port for network address translation of a new packet flow. In response, NAT controller 84 selects an unused network address and applies the techniques described herein to select a port to be used in the network address translation, where this selection that ensures that inbound and outbound packet flows for a subscriber session are directed to the same services processing unit (SPU) of a device. In some examples, NAT controller 84 maintains a port lookup table 86 having a set of entries (e.g., row), each of the entries associates with a different group of ports. Moreover, NAT controller 84 constructs port lookup table 86 such that each group of ports specifies ports having port values such that any of the ports in the same group result in the same one of SPUs 80 being selected when the service selection function is applied.

Management daemon (MGD) 82 of routing engine 46 communicates with and programs service processing units 80 of service plane 64. For example, routing engine 66 may present a user interface (UI) 89 to receive configuration data from administrator 70. In response, MDG 82 programs SPUs 80 with corresponding configuration data, causing SPUs 80 of service plane 64 to perform the functions described herein when processing packets redirected from forwarding plane 62.

Figure 3:
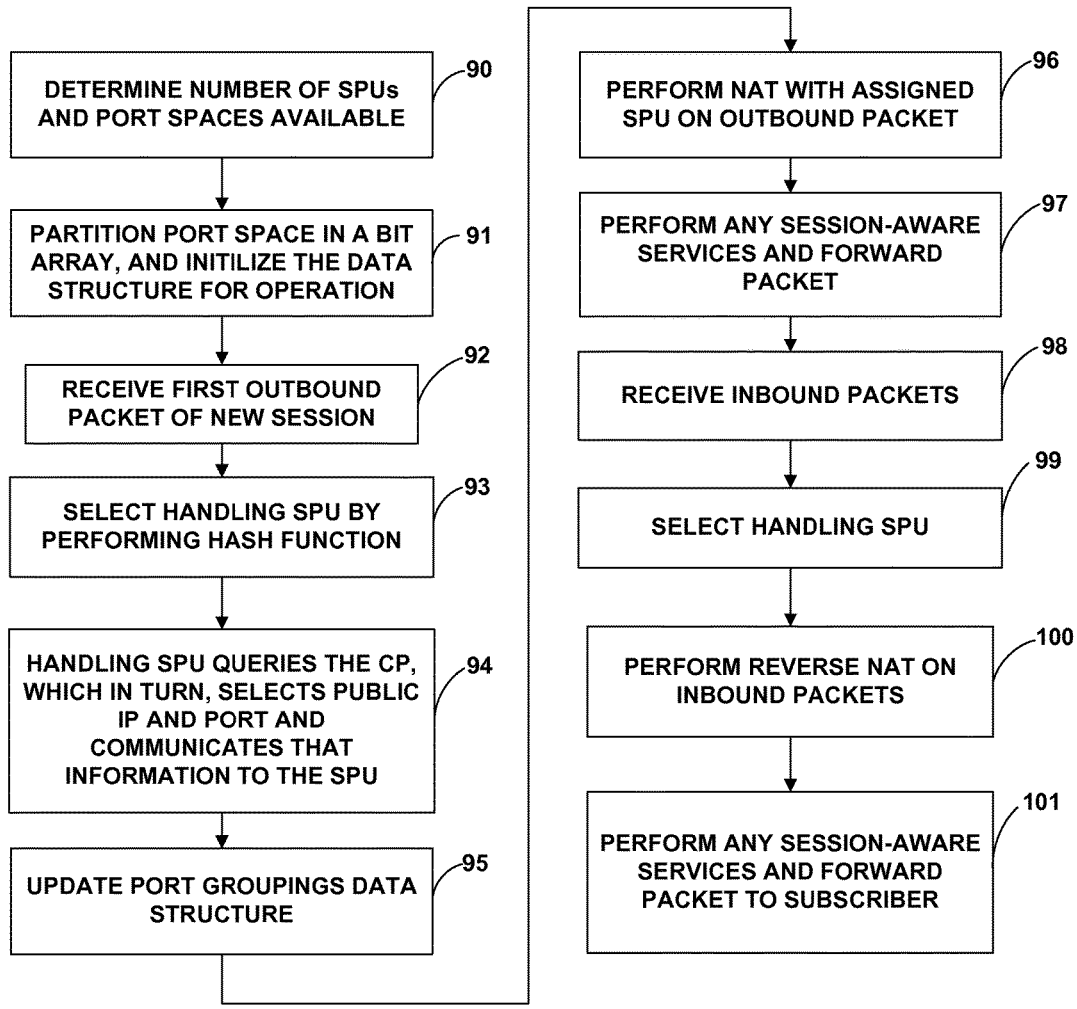
FIG. 3 is a flowchart illustrating example operation of a NAT device in accordance with the techniques described herein

FIG. 3 is a flowchart illustrating example operation of a NAT device (e.g., NAT device 41 of FIG. 1 or network device 50 of FIG. 2) in accordance with the techniques described herein. For purposes of example, the flowchart of FIG. 3 will be described with respect to network device 50 of FIG. 2.

Upon initialization, network device 50 determines the number of SPUs and the number of ports available in the overall port space used during network address translation (90). For example, network device 50 may sense the number of SPUs 80 installed or may receive configuration information from administrator 70.

Next, NAT controller 84 partitions the overall port space into groups of ports having port values that when the hash function is applied would result in selection of the same one of SPUs 80. For example, assuming a total number of SPUs 80 equals 256 and a total port space of 65,536, NAT controller 84 may compute the number of port groups as 65,536/256=256 port groups. Each of the port groups consists of a set of ports having port values that produce selection of the same one of SPUs 80. That is, in this example, each port value in a given group differs by an offset equal to the total number of SPUs N so as to yield the same remainder when the modulo operation is applied to the port value with the number of SPUs 80. For example, a first one of the port groups may consist of ports {0, 256, 512, . . . }, while the second one of the port groups may consist of the ports {1, 257, 513 . . . }.

In one example, NAT control 84 constructs port lookup table 86 to have a set of entries, each of the entries associated with a respective one of the plurality of groups of ports. For example, port lookup table 86 may be a table or other data structure by which NAT controller 84 indicates whether a particular port of a particular port group is currently assigned for NAT for a current communication session. In one example, each of the entries of port lookup table 86 comprises a bit vector having a plurality of bits, each of the bits corresponding to a different one of the ports in the respective group of ports and indicating whether the respective port is currently assigned to a subscriber session for network address translation. Once NAT controller 84 has constructing port lookup table 86, NAT controller 84 can initialize the data structure of port lookup table 86 by, for example, setting all bits in the matrix of bit vectors to an initial value, e.g., zero (91).

In operation, service unit selector 88 of network device 50 receives a first outbound packet of a new session (92) and applies the service unit selection function to select the handling SPU (93). For example, service unit selector 88 may perform a hash function on the current 5-tuple of the outbound packet to load balance the session among SPUs 80

(93). Once selected, the handling SPU issues a query 87 to NAT controller 84, which in turn, selects the public IP address and port using techniques described herein and illustrated in FIG. 4 (94). NAT controller 84 communicates the public IP address and port information to the handling SPU (94). Network device 50 may then update port groupings of port lookup table 86 (95). Finally, the handling SPU may perform the NAT operation on the outbound packet (96), and perform any needed session-aware services (97), and forward the outbound packet.

Furthermore, service selector unit 88 may receive inbound packets destined for subscribers, where the inbound packets are of the same subscriber session as the previously handled outbound packet flow (98) and apply the same service unit selection function in order to select one of SPUs 80 to which to direct the inbound packet flow (99). Based on techniques described herein, service selector unit applies the hash function, which results in selection of the same one of SPUs as was selected to handle the outbound packet flow for the subscriber session. The handling one of SPUs 80 performs reverse NAT on the inbound packet (100), as well as performing any needed session-aware services (101), and may then forward the inbound packet to the subscriber. In this manner, the techniques can apply NAT while avoiding potentially having to internally redirect the inbound packet for a session from one SPU to another to ensure that both inbound and outbound packet flows for a session are directed to the same SPU for proper application of services. This can be useful when the SPU must also apply session-aware services to inbound and outbound packet flows of the communication session, such as firewall operations, billing services, deep-packet inspection (DPI), for example. Avoiding a need to internally redirect inbound packets between SPUs can result in more streamlined packet processing, and potentially save time and computing resources.

Figure 4:
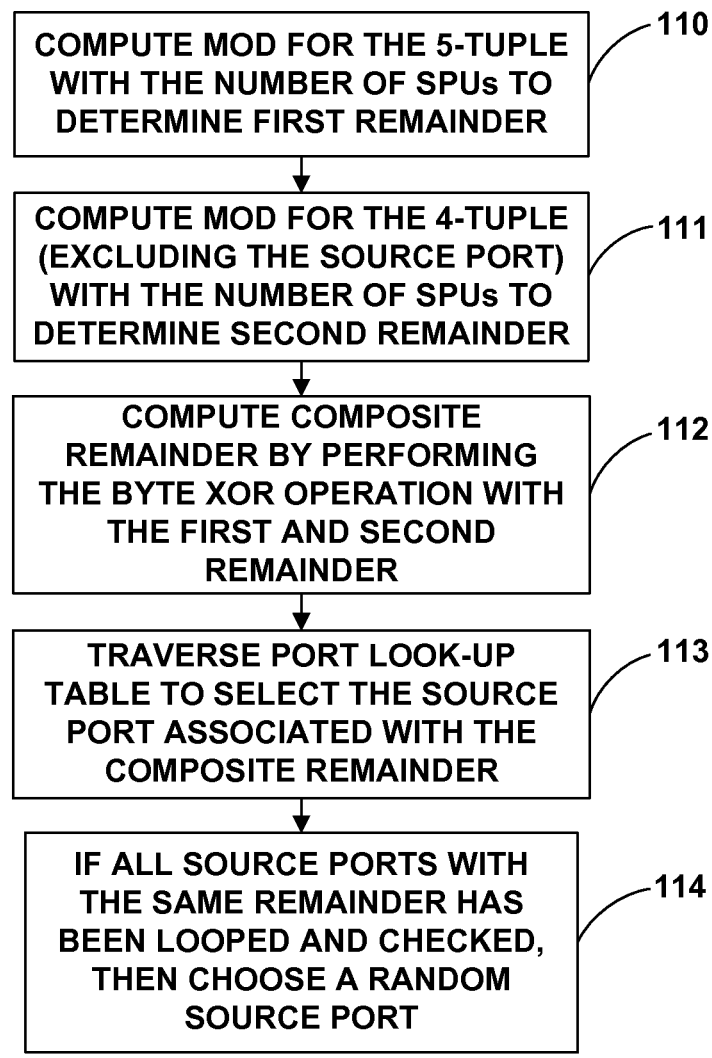
FIG. 4 is a flowchart illustrating in further detail an example process of assigning a source port for NAT to ensure that inbound and outbound packet flows for a subscriber session are directed to the same services processing unit (SPU) of a device.

FIG. 4 is a flowchart illustrating example operation of a NAT device (e.g., NAT device 41 of FIG. 1 or network device 50 of FIG. 2) when selecting a source port address such that the inbound packets of a NATed session have the same hash value and are directed to the same SPU as the outbound packets of the session. For example, FIG. 4 illustrates in further detail example operation of a device such as network device 50 when performing step 94 of FIG. 3.

Upon receiving query 87 conveying the original 5-tuple of an outbound packet for a newly detected subscriber session, NAT controller 84 selects a free public network address and then computes the modulo of the 5-tuple and the number of SPUs to determine the first remainder (110). That is, NAT controller 84 applies the modulo operation to the original 5-tuple using the number N of SPUs 80, where the 5-tuple specifies a combination of the private source network address, source port, a public destination network address, destination port and protocol specified in the original header of the outbound packet.

Next, NAT controller 84 computes the modulo for the 4-tuple that would be seen in any inbound packet (source port excluded) with the number of SPUs to determine the second remainder (111). Specifically, NAT controller 84 computes the modulo of a 4-tuple of the translated packet with the number of service units to determine a second remainder, wherein the 4-tuple specifies a combination of the public source network address selected by NAT controller 84 as well as the public destination network address, destination port and protocol specified in the header of the outbound packet.

NAT controller 84 computes the composite remainder by calculating the exclusive OR (XOR) result of the first and second remainder (112). This composite remainder is indicative of the remainder that will be produced when service unit selector 88 subsequently receives inbound packets destined for subscribers for the particular communication session. As such, NAT controller 84 traverses port lookup table 86 in order to select the port from the group of ports that would produce the necessary composite remainder, thereby leading to assignment of the same handling one of SPUs 80 (113). If no source port within the group of source ports associated with the composite remainder is available, NAT controller 84 may assign a random source port (114).

The following illustrates how a NAT device can select a source port address such that the inbound packets of a NATed session have the same hash value and are directed to the same SPU as the outbound packets of the session. Here, M1 stands for the original 5 tuple, and M2 stands for the 5 tuple after NAT. src_ip', src_port', dst_ip', dst_port' may be different from original wing.

We start with: M1% spu_num=M2% spu_num.
Since $A \wedge B = B \wedge A$, replace M2 with 5 tuple calculation:
M1% spu_num=(src_port'$\wedge$src_ip'$\wedge$dst_ip'$\wedge$dst_port'$\wedge$protocol) % spu_num.
Let D replace src_ip'$\wedge$dst_ip'$\wedge$dst_port'$\wedge$protocol.
This gives:
M1% spu_num=(src_port'$\wedge$D) % spu_num.
If spu_num=$2^n$, then $(A \wedge B) \% 2^n = (A \% 2^n) \wedge (B \% 2^n)$, and flow guarantees this assumption is always correct.
Thus, M1% spu_num=(src_port'% spu_num)$\wedge$(D % spu_num).
Since $C = A \wedge B$; $A = C \wedge B$, and $B = C \wedge A$, we have:
src_port'% spu_num=(D % spu_num)$\wedge$(M % spu_num).

Figure 5:
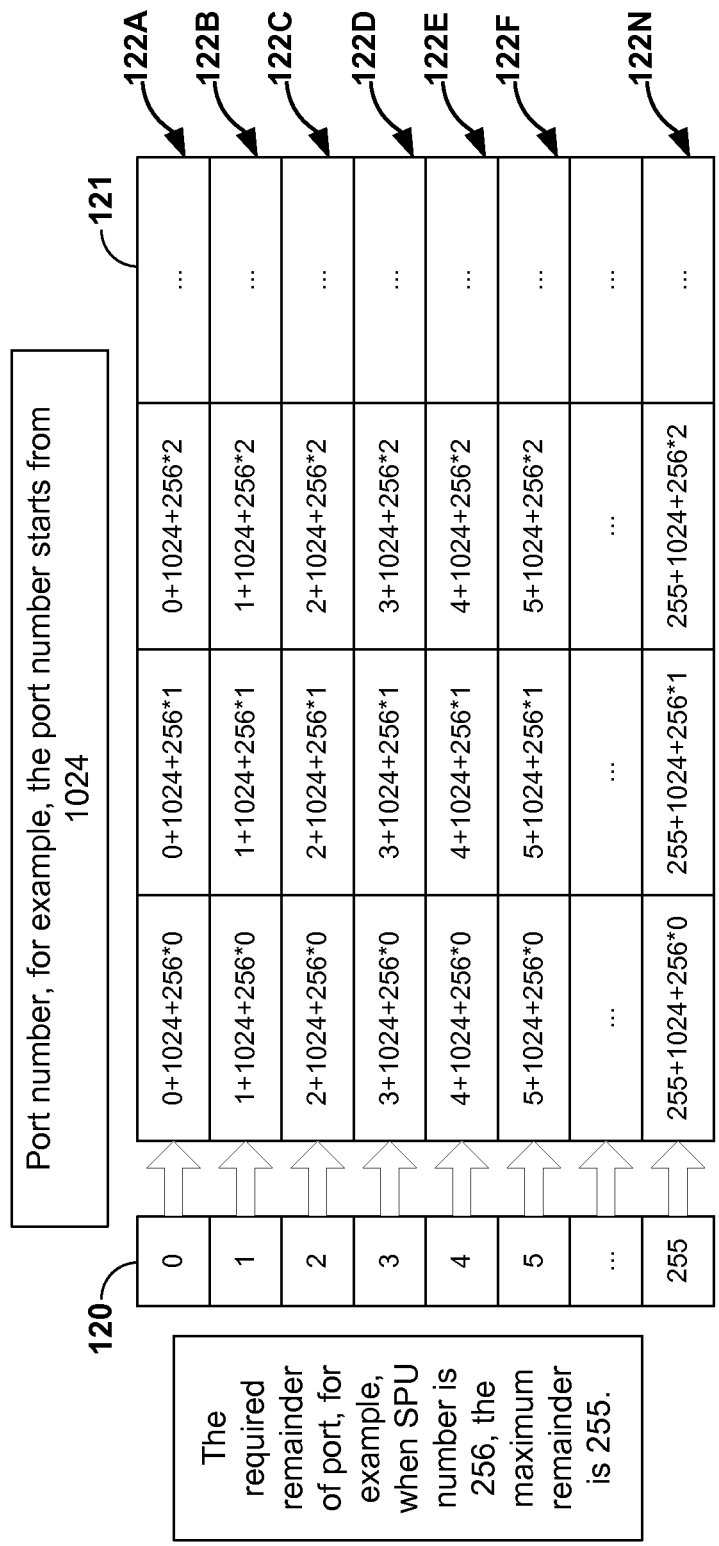
FIG. 5 is a schematic diagram illustrating data structure having a set of source port groupings utilized by the NAT techniques described herein.

FIG. 5 illustrates an example port lookup table 121 that may be an example implementation of port lookup table 86. As shown in FIG. 5, the example port lookup table 121 includes a set of entries (e.g., rows) 122A-122N that effectively partition the overall port space into N port groupings. Each of entries 122 is associated with a different group of ports. Moreover, each group of ports specifies ports having port values such that any of the ports in the same group result in the same one of SPUs 80 being selected when the service selection function (e.g., a hash function) is applied.

In this example, the port lookup table is constructed with 256 total number of SPUs 256 and a total port space of 65,536, thus leading to 256 port groups. Each of the port groups consists of a set of ports having port values that produce selection of the same one of SPUs 80. That is, in this example, each port value in a given group differs by an offset equal to the total number of SPUs N so as to yield the same remainder when the modulo operation is applied to the port value with the number of SPUs 80. For example, a first one of the port groups may consist of ports {0, 256, 512, . . . } while the second one of the port groups may consist of the ports {1, 257, 513 . . . }.

EXAMPLE

In an example, a NAT device having 256 SPUs may receive a packet with 5-tuple values as follows: src ip=1.1.1.1, src port=100, dst ip=2.2.2.2, dst port=100, and protocol=6. In selecting an SPU, service unit selector 88 hashes the 5-tuple (1.1.1.1, 100, 2.2.2.2, 100, 6) by applying a service unit selection function that is defined as the byte XOR of the values within the 5-tuple and performing a modulo operation of the result using 256 as the number of SPUs in order to determine the remainder:

spu_id=(byte XOR(1.1.1.1, 100, 2.2.2.2, 100, 6)) % 256=6

In this example, the hash calculation yields a remainder of 6. Therefore, service unit selector 88 distributes the outbound packet to the SPU associated with a remainder of 6.

In this example, NAT controller 84 assigns a free public source network address of 4.4.4.4. In addition, assume for purposes of example that the packet also undergoes destination NAT such that, for example, the dst ip is to be changed to 3.3.3.3 and the dst port is to be changed to 200.

In order to ensure the inbound packets for the same communication session are distributed to the same SPU, NAT controller 84 selects a source port such that the hash of the inbound 5-tuple will be equal to the original outbound 5-tuple hash. In this example, the source translated port is determined by equating the 4-tuple remainder (excluding the source port) with MOD 256, the number of SPUs, with the original 5-tuple remainder of 6. The byte XOR operation is be performed between the original 5-tuple remainder and the 4-tuple remainder yielding a composite remainder of 206 in this example. Next, NAT controller 84 traverses port look-up table 86, described in detail above, in order to allocate a source port from a group of ports that are all associated with the remainder of 206, thereby selecting a port that, when utilized in the 5-tuple for incoming packets, will produce a remainder of 6 and, therefore, be directed to the same SPU as outbound packets for the session. If all source ports associated with remainder 206 have been allocated, network device 50 may then allocate a random source port for the inbound packet.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals or carrier waves, although the term "computer-readable media" may include transient media such as signals, in addition to physical storage media.

Various embodiments of the invention have been described. These and other embodiments are within the scope of the following claims.

The invention claimed is:

1. A method comprising:

receiving, with a network device having a plurality of service units, outbound packets of a communication session for a subscriber, wherein each outbound packet includes a private source network address and source port, and wherein each of the plurality of service units is configured to perform network address translation (NAT) in parallel on packets of different communication sessions;

applying a service unit selection function to at least a portion of a header of the outbound packet to produce a result;

selecting, from the plurality of service units performing NAT in parallel and based on the result, a first one of the service units to perform NAT for the packets of the communication session;

selecting, with the network device, a public network address for network address translation of the outbound packet for the communication session;

determining, with the network device, a port for network address translation that, when the service unit selection function is applied to the portion of the header after the private source network address and source port of the inbound packet are replaced with the selected public network address and the determined port, causes the network device to direct subsequently received inbound packets having the selected public network address and the determined port to the same first one of the service units;

generating a translated packet from the packet, wherein the translated packet includes the selected public network address and the determined port in place of the private source address and source port; and forwarding the translated packet from the network device to a public network.

2. The method of claim 1, wherein applying a service unit selection function to at least a portion of a header of the outbound packet to produce a first result comprises applying a hash function to the portion of the header of the inbound packet and computing the result as a remainder of the hash function modulo the number of the plurality of service units of the network device.

3. The method of claim 2, wherein applying a hash function comprises applying a hash function to a 5-tuple of the header of the outbound packet, wherein the 5-tuple specifies a combination of the private source network address, source port, a public destination network address, destination port and protocol specified in the header of the outbound packet.

4. The method of claim 3, wherein determining a port for network address translation comprises:

computing the modulo of the 5-tuple of the inbound packet and the number of service units to determine a first remainder;

computing the modulo of a 4-tuple of the translated packet with the number of service units to determine a second remainder, wherein the 4-tuple specifies a combination of the public source network address, public destination network address, destination port and protocol specified in the header of the translated packet;

computing a composite remainder by calculating the exclusive OR (XOR) of the first and second remainder; and selecting the port for network address translation from a group of ports having port values that produce the composite remainder when applied with the modulo operation of the number of service units.

5. The method of claim 4,
wherein selecting the port comprises traversing a port look-up table based on the composite remainder to select the port for network address translation from the group of ports having port values that produce the composite remainder when applied with the modulo operation of the number of service units, and wherein the port look-up table comprises a set of entries, each of the entries is associated with a respective one of a plurality of groups of ports.

6. The method of claim 5, further comprising:
in response to determining the port, updating the port look-up table to mark the port as assigned; and in response to determining that all the ports in the group of ports that produce the composite reminder are assigned, randomly allocating a port from the port lookup-table.

7. The method of claim 5, wherein each entry of the set of entries comprises a bit vector having a plurality of bits, each of the bits corresponding to a different respective port in the respective one of the plurality of groups of ports and indicating whether the respective port is currently assigned to a subscriber session for network address translation.

8. The method of claim 1, further comprising:
receiving, with the network device, an inbound packet for the communication session and destined for the subscriber, wherein the inbound packet includes the public source network address as a destination network address and includes a port as a destination port;

performing, with the first one of the service units, reverse network address translation on the inbound packet to replace the public source network address and port with a private network address and port associated with the subscriber; and forwarding the inbound packet modified to have the private network address and port to the subscriber.

9. The method of claim 8, further comprising performing, with the first one of the service units, one or more session-aware services on the communication session based on inbound packets and outbound packets associated with the communication session, wherein the session-aware services are performed by the first one of the service units without redirecting any of the inbound packets or the outbound packets between the service units for application of the session-aware services.

10. A network device comprising:
a network interface to receive an outbound packet of a communication session for a subscriber, wherein the outbound packet includes a private source network address and source port;

a plurality of service units configured to perform network address translation (NAT) in parallel on packets from different communication sessions;

a service unit selector configured to apply a service unit selection function to at least a portion of a header of the outbound packet to produce a result, and select, from the plurality of service units performing NAT in parallel and based on the result, a first one of the service units to perform NAT for the packets of the communication session; and a NAT controller configured to select a public network address for network address translation of the outbound packet for the communication session, wherein the controller determines a port for network address translation that, when the service unit selection function is applied to the portion of the header after the private source network address and source port of the inbound packet are replaced with the selected public network address and the determined port, causes the network device to direct subsequently received inbound packets having the selected public network address and the determined port to the same first one of the service units.

11. The network device of claim 10, further comprising a forwarding component to output a translated packet that includes the selected public network address and the determined port in place of the private source address and a source port of the outbound packet.

12. The network device of claim 10, wherein the service unit selection function comprises a hash function that the service unit selector applies to the portion of the header of the inbound packet, and wherein the service unit selector computes the result as a remainder of a hash function modulo the number of the plurality of service units installed in the network device.

13. The network device of claim 12, wherein the service selector unit applies the hash function to a 5-tuple of the header of the outbound packet, the 5-tuple comprising a combination of the private source network address, source port, a public destination network address, destination port and protocol specified in the header of the outbound packet.

14. The network device of claim 13, wherein the NAT controller determines the port for network address translation by:
computing the modulo of the 5-tuple of the inbound packet and the number of service units to determine a first remainder;

computing the modulo of a 4-tuple of the translated packet with the number of service units to determine a second remainder, wherein the 4-tuple specifies a combination of the public source network address, public destination network address, destination port and protocol specified in the header of the translated packet;

computing a composite remainder by calculating the exclusive OR (XOR) of the first and second remainder; and selecting the port for network address translation from a group of ports having port values that produce the composite remainder when applied with the modulo operation by the number of service units.

15. The network device of claim 14, wherein the NAT controller selects the port by traversing a port look-up table based on the composite remainder to select the port for network address translation from the group of ports having port values that produce the composite remainder when applied with the modulo operation of the number of service units, wherein the port look-up table comprises a set of entries, each of the entries associated with a respective one of a plurality of groups of ports.

16. The network device of claim 15,
wherein the NAT controller constructs the port look-up table as a data structure having a plurality of entries, wherein each of the entries is associated with a respective one of a plurality of groups of ports that are each associated with a different one of the service units, and wherein each of the ports within each respective group produces a selection of the respective service unit associated with the group when the port is selected as the source port for network address translation.

17. The network device of claim 16, wherein each of the entries comprises a bit vector having a plurality of bits, each of the bits corresponding to a different one of the ports in the respective group of ports and indicating whether the respective port is currently assigned to a subscriber session for network address translation.

18. The network device of claim 10,
wherein the network interface is configured to receive an inbound packet for the communication session and destined for the subscriber, wherein the inbound packet includes the public source network address as a destination network address and includes a port as a destination port,
wherein the first one of the service units performs reverse network address translation on the inbound packet to replace the public source network address and port with the private network address and port associated with the subscriber and forwards the inbound packet modified to have the private network address and port to the subscriber.

19. The network device of claim 18,
wherein the first one of the service units performs one or more session-aware services on the communication session based on inbound packets and outbound packets associated with the communication session, and
wherein, responsive to the service unit selection function, the service unit selector directs the inbound packets and the outbound packets to the first one of the service units for performance of the session-aware services without any of the inbound packets or the outbound packets being redirected between the service units for application of the session-aware services.

20. A non-transitory computer-readable storage medium comprising instructions for causing at least one programmable processor of a network device having a plurality of service units to:
receive outbound packets of a communication session for a subscriber, wherein each outbound packet includes a private source network address and source port, and wherein each of the plurality of service units is configured to perform network address translation (NAT) in parallel on packets of different communication sessions;
apply a service unit selection function to at least a portion of a header of the outbound packet to produce a result;
select, from the plurality of service units performing NAT in parallel and based on the result, a first one of the service units to perform NAT for the packets of the communication session;
select a public network address for network address translation of the outbound packet for the communication session;
determine a port for network address translation that, when the service unit selection function is applied to the portion of the header after the private source network address and source port of the inbound packet are replaced with the selected public network address and the determined port, causes the network device to direct subsequently received inbound packets having the selected public network address and the determined port to the same first one of the service units;
generate a translated packet from the packet, wherein the translated packet includes the selected public network address and the determined port in place of the private source address and source port; and
forward the translated packet from the network device to a public network.

* * * * *